United States Patent Office 3,472,993
Patented Oct. 14, 1969

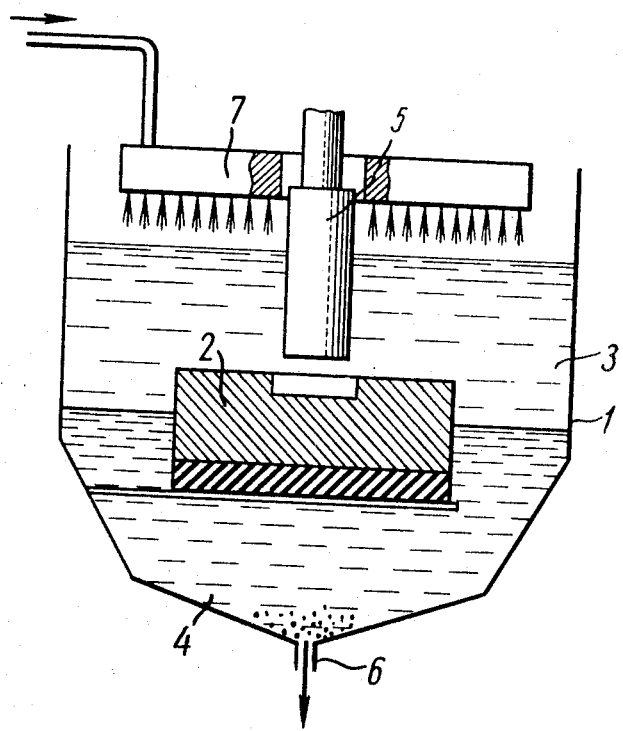

3,472,993
METHOD OF ELECTROEROSION MACHINING A METAL WORKPIECE IN A DIELECTRIC FLUID RESTING ON AN IMMISCIBLE, HEAVIER, ELECTROLYTIC SOLUTION
Anatoly Pavlovich Gromov, 2 Pryadilnaya, ul. 9, kv. 34, and Evgenia Nikolaevna Lukasheva, Kutuzovsky prosp. 4/2, kv. 144, both of Moscow, U.S.S.R.; Anatoly Vasilievich Glazkov, Sadovaya ul. 10a, kv. 70, Moskowskaya Obl., Kaliningrad, U.S.S.R.; Abram Lazarevich Livshits, Profsojuznaya ul. 62, kor. 2, kv. 69; Vladimir Vasilievich Pozhalkin, Kuntsevo, Polotskaya ul. 8, kv. 12; Vadim Evgenievich Polotsky, Leninsky prosp. 70/11, kv. 238; and Mikhail Venediktovich Scherbak, Samotechnaya ul. 17a, kv. 23, all of Moscow, U.S.S.R.
Filed May 5, 1966, Ser. No. 547,818
Int. Cl. B23k 9/16
U.S. Cl. 219—69    3 Claims

ABSTRACT OF THE DISCLOSURE

A method of electroerosion machining is provided wherein a workpiece is positioned across the interface between a dielectric fluid and an immiscible, heavier, workpiece-cooling and chemically treating electrolytic solution and an electrode is located adjacent the workpiece but above the liquid interface to effect electroerosion, more of the electrolytic solution being passed down through the dielectric fluid to cool the same and remove metal waste from the dielectric fluid and assist in cleaning the gap between the electrode and the workpiece.

---

The invention relates to methods of electroerosion machining of metals, and more particularly, to a method combining electroerosion machining with electrochemical treatment, as well as with the usage of a working liquid medium.

There are known methods of electroerosion machining wherein the workpiece is placed in the working medium and machined by means of electroerosion with the simultaneous removal of the erosion products by the circulating working fluid, for example mineral oil or kerosene.

The working fluid is fed under pressure into the interelectrode space, and then, after being used, is delivered into settling tanks where it is refined. On cooling the fluid is used again.

At present, the interest in the methods of electroerosion machining includes specific requirements and conditions of mass production, among which the need for high efficiency is of particular importance.

A disadvantage of the known methods of electroerosion machining resides in inadequate cooling of the working medium and in their low efficiency.

Another disadvantage of the heretofore known methods is that they do not provide for a perfect refinement of the working medium, which results in a low and non-constant value of its electrical strength.

The main object of the invention is to eliminate the afore-mentioned disadvantages.

A more specific object of the invention is to provide an effective method of electroerosion machining which meets the requirements of mass production, ensures high productivity, adequate cooling and high-quality cleaning of the working medium of erosion products.

According to the invention, these objects are achieved by placing the workpiece to be erosion-machined in the working liquid medium and by subjecting it to electroerosion and electrochemical treatment. The treatment is carried out in a multilayer working medium consisting of at least two immiscible liquids having different specific gravities.

The removal of erosion products from the working area and cooling of the liquid medium are effected by means of a liquid having a greater specific weight as compared with those of the other components of the medium, for example by water passed downwards through the working area.

It is preferable to carry out the treatment in the interface between the layers of the working liquid medium, and coagulative agents and alkali solutions may be added to the cooling fluid.

The invention is hereinafter exemplified by the preferred embodiment of the method proposed herein with reference to the accompanying drawing diagrammatically illustrating, in elevation view and partly in section, a device designed for electroerosion machining of metals by the proposed method.

To carry out the electroerosion method of metal treatment, there is placed into bath 1 a workpiece 2, said bath containing a working medium consisting, for example, of layers 3 and 4 of immiscible liquids of different specific gravity. The components of the working medium are so selected that the layer 3 usually comprises a liquid (for example oil, kerosene, etc.) having dielectric properties and the layer 4 comprises water and aqueous solutions of acids, salts, or alkalis.

The depth of the layer 3 should be such that it is possible to place in this layer a tool 5 and a part of the workpiece 2 being treated by said tool.

In this case wastes of the metal may pass from the upper layer 3 into the lower layer 4 and then be removed through a hole 6.

Water is delivered from a distributor 7 to the surface of the working medium to cool the layer 3 and carry away products of the electroerosion treatment. Additionally, to cool the layer 3 and to carry away products of electroerosion machining of metals, water may be fed into the layer through ducts in the tool 5 located above the gap.

The proposed method makes it possible to combine electroerosion and electrochemical treatment.

Periodic feed of water or aqueous solutions to the interelectrode space provides for the cooking of the working medium, electrode and workpiece under treatment. The explosive character of the steam generation process in machining the workpieces requires removal of erosion products from the working area. The proposed method may be used in manufacturing various articles from hard alloys and heat-resistant steels.

What is claimed is:
1. A method of electroerosion machining of a metal workpiece, said method comprising forming a working medium constituted of at least two immiscible liquids of different specific gravity having a common interface, the lighter liquid being a dielectric fluid and the heavier liquid being a workpiece-cooling and chemically treating electrolytic solution, positioning a workpiece across the interface between the liquids, locating an electrode adjacent the workpiece and above the interface to form a gap between the electrode and workpiece, and passing more of said electrolytic solution down through the dielectric fluid to cool the dielectric fluid and to remove metal waste from the dielectric fluid and assist in cleaning said gap.

2. A method as claimed in claim 1 comprising adding coagulative agents into the electrolytic solution which is passed down through the dielectric fluid.

3. A method as claimed in claim 1 comprising adding alkali solution into the electrolytic solution which is passed down through the dielectric fluid.

References Cited

UNITED STATES PATENTS 2,526,423  10/1950  Rudorff.
2,996,602  8/1961  Webb.

JOSEPH V. TRUHE, Primary Examiner
R. F. STAUBLY, Assistant Examiner